Oct. 24, 1967

L. O. KELLEY 3,348,383

CABLE LAYING PLOW WITH BRACE ATTACHMENT

Filed June 28, 1965

LEON O. KELLEY
INVENTOR.

BY Wayland D. Keith

HIS AGENT

Oct. 24, 1967  L. O. KELLEY  3,348,383
CABLE LAYING PLOW WITH BRACE ATTACHMENT
Filed June 28, 1965  3 Sheets-Sheet 3

LEON O. KELLEY
INVENTOR.

BY
*Wayland D. Keith*
HIS AGENT

United States Patent Office 3,348,383
Patented Oct. 24, 1967

3,348,383
CABLE LAYING PLOW WITH BRACE
ATTACHMENT
Leon O. Kelley, P.O. Box 488, Stamford, Tex. 79553
Filed June 28, 1965, Ser. No. 467,323
7 Claims. (Cl. 61—72.6)

ABSTRACT OF THE DISCLOSURE

An earth engaging plow capable of opening a trench or furrow several feet in depth, as a prime mover pulls the plow across the terrain. The shank of the plow is so braced, between the shank and the primer mover, in parallelogram relation as to minimize strain on the plow shank mounting frame, but will permit the plow and plow shank to be raised and lowered, while maintaining the plow shank in substantially the same relative upright relation at all points at which the plow shank is designed to operate, from maximum depth to a position above the terrain. Provision is made to adjust the angularity of the digging point of the plow. Further provision is made to swing the plow shank laterally to either side of a medial line passing longitudinally through the prime mover, with the plow shank paravaning in parallel relation with the course traversed by the prime mover. Further provision is made to direct a cable or conduit along the rear of the plow shank to the bottom of the trench or furrow immediately rearward of the plow.

---

Figure 1:
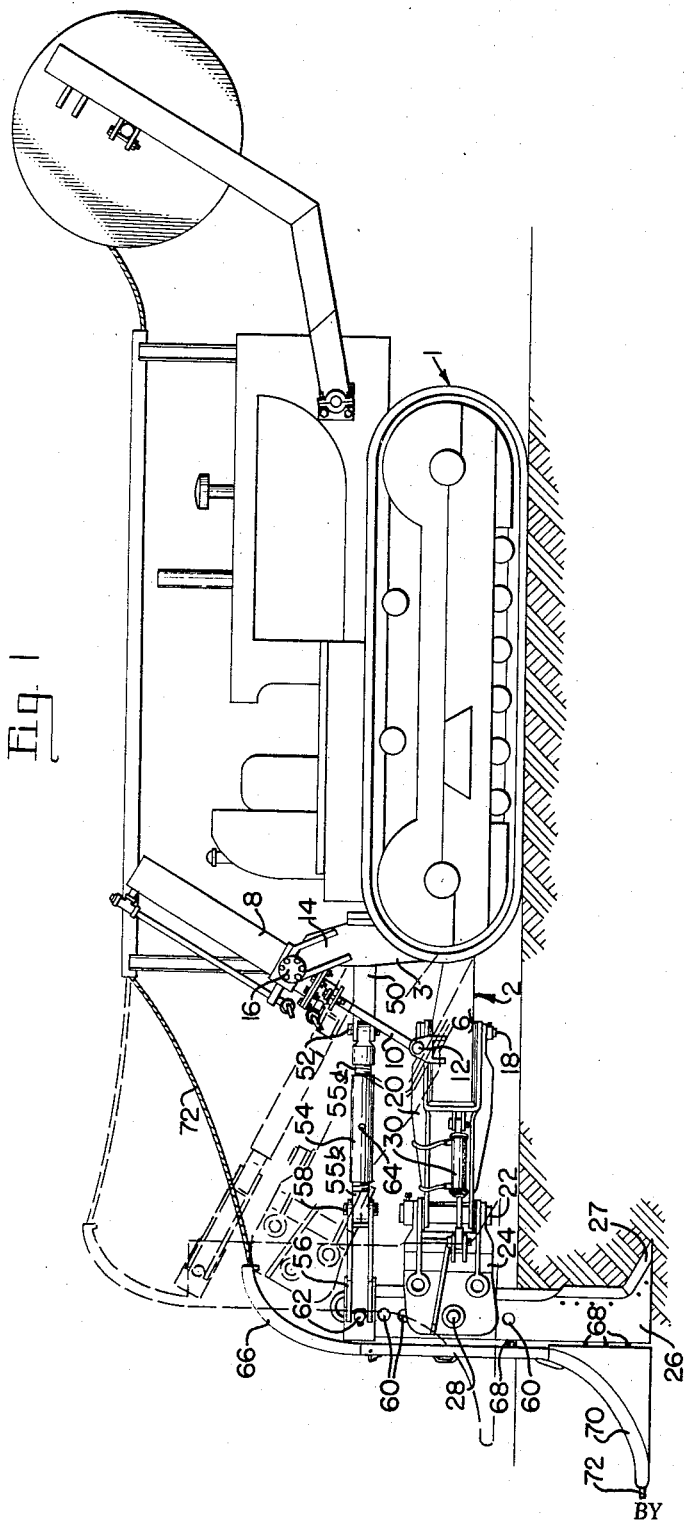

This invention relates to improvements in plows and more particularly to ripper-like plows used in the laying of cable.

Various plows for ripping and for laying cable have been proposed heretofore, but these, for the most part, lacked the maneuverability, rigidity, and stability of the present device when pulled through the earth behind a powerful traction element, at a depth of several feet.

The present device is so constructed that the plow will maintain a fixed relation with respect to the terrain, regardless of the depth at which the plow is operating, and if set in a vertical position, the ripper plow or blade will maintain a substantially vertical position throughout the entire vertical movement of the plow.

The present device is particularly adaptable to an earth engaging plow for laying cable, which plow may be moved from side to side, while maintaining a generally "straight ahead" course.

An object of this invention is to provide an earth engaging plow which may be maintained in upright, fixed relation with respect to the terrain, regardless of the depth, within the working limits of the device.

Another object of the invention is to provide a bracing arrangement for an earth engaging plow which will stabilize the plow and which will maintain the plow in fixed, upright relation, but which will permit free lateral swinging movement and free vertical movement thereof.

Still another object of the invention is to provide an earth engaging plow shank which may be adjusted to a fixed, upright position with respect to the vertical, and which will be maintained in this position through both horizontal and upright movement.

Yet another object of the invention is to provide an adjustment device for a cable laying plow, which will enable the cable laying plow to be fully maneuverable with respect to lateral and vertical movement, while being towed behind a traction element.

Figure 2:
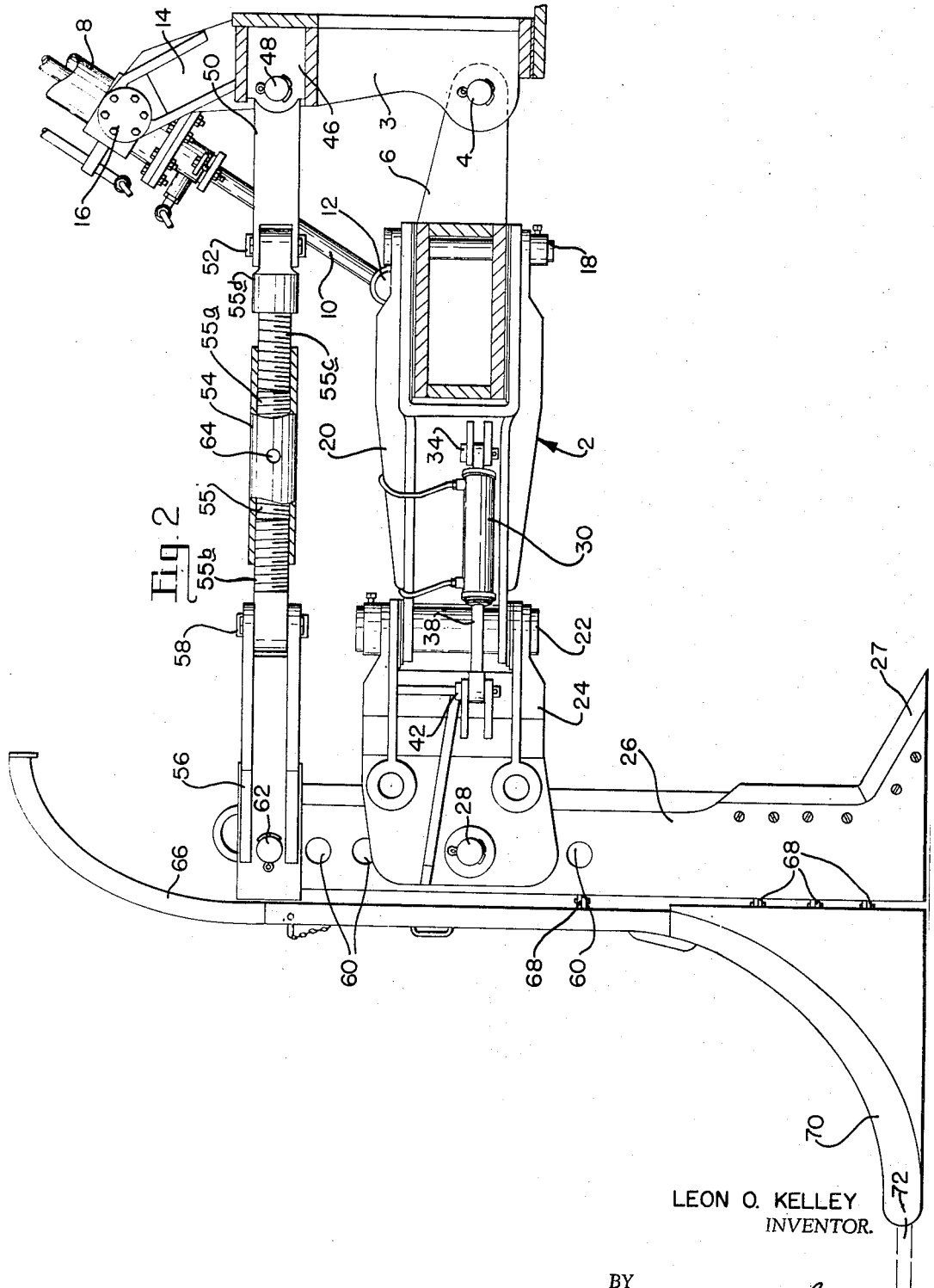
Figure 3:
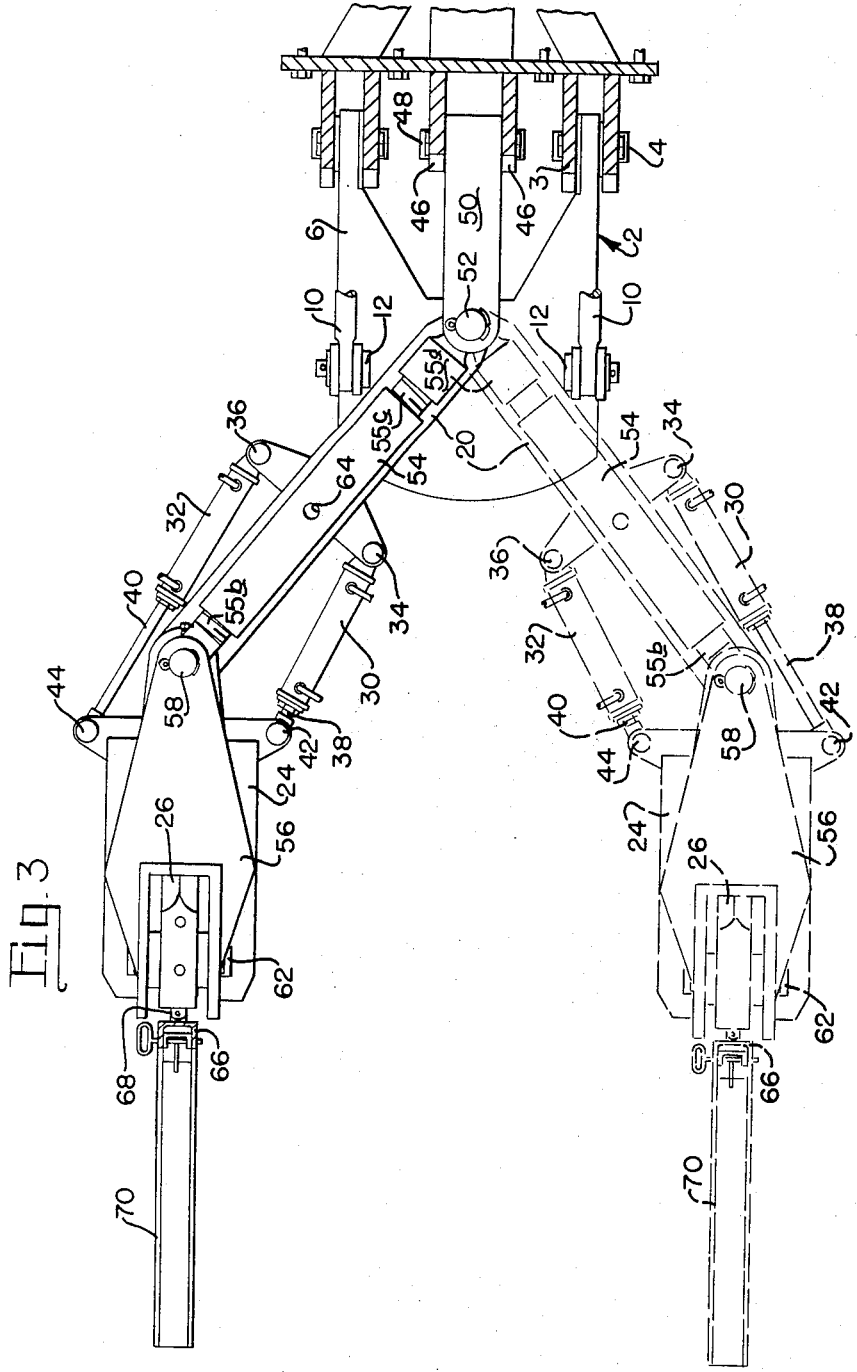

With these objects in mind, and others which will become manifest as the description proceeds, reference is to be had to the accompanying drawings in which like reference characters designate like parts in the several views thereof, in which:

FIG. 1 is a side elevational view of a traction element of the crawler type, showing an earth engaging plow connected thereto, the plowing position of the earth engaging plow being shown in full outline, the raised position thereof being shown in dashed outline; showing means for stabilizing the earth engaging plow in fixed relation with respect to the vertical, and showing a cable laying attachment mounted on the traction element and associated with the earth engaging plow;

FIG. 2 is an enlarged side elevational view of the earth engaging plow and the cable laying arrangement associated therewith, showing a fragmentary portion of a hydraulic lift, and showing portions of an adjustment screw device broken away to show the details of construction, other parts associated with the cable laying plow being shown in section; and FIG. 3 is a top plan view, on an enlarged scale, of the earth engaging plow as used with a cable laying device with parts broken away and with parts being shown in section to bring out the details of construction, with an alternate position being shown in dashed outline.

With more detailed reference to the drawings, the numeral 1 designates generally a crawler type tractor, which is used as the traction element, and is generally known as a "Caterpillar" tractor. However, it is to be understood that the traction element is representative of an associated prime mover, as the present device may be used with any type of traction element which is capable of developing sufficient horsepower to operate an earth engaging plow to the particular depth at which it is to be used.

The traction element 1 has a bracket 3 mounted on the rear end thereof and secured thereto, to which bracket 3 on earth engaging plow 2 is pivotally connected by a pivot pin 4, to enable the frame 6 of plow 2 to be moved about a horizontal axis. The mounting bracket 3 has a bracket 14 thereon which extends upwardly therefrom and has a pivot arrangement 16 to pivotally mount hydraulic cylinder 8 thereon. The hydraulic cylinder 8 has a plunger 10 therein, which plunger extends downward therefrom, and is pivotally connected to the frame 6 by a pivot pin 12. The cylinder 8 is pivotally mounted on bracket 14 by the pivot pin arrangement 16, such as shown in my Patent No. 3,170,300 for Tractor Mounted Cable Laying Device, issued Feb. 23, 1965. The frame 6 extends rearwardly and has a pivot pin 18 passing vertically therethrough and through bifurcated frame 20, so that the frame 20 will hinge about vertical pivot pin 18, in the manner best seen in FIG. 3. The frame 20 has a second pivot pin 22 near the rear end thereof, which pivot pin 22 pivotally connects frame 20 to a plow or ripper shank holding frame 24. The vertical pivot arrangement will permit the shifting of frame 24 from the position as shown in full outline in FIG. 3 to the position as shown in dashed outline therein, so as to maintain the cutting edge of a plow or ripper shank in aligned relation with the movement of the plow through the ground. The earth engaging plow or ripper shank 26 has spaced apart holes formed therein along the length thereof to enable the placing of pivot pins 28 and 62 therein, so the plow or ripper shank 26 can be adjusted up and down with respect to the frame 24 to enable plowing to the desired depth, while maintaining the plow or ripper shank 26 in adjusted, upright position at all times. Normally it is desirable to have the distance from pivot pin 4 to the pivot pin 28 the same as the distance from pivot pin 48 to pivot pin 62. Furthermore, it is desirable to have the distance from pivot pin 28 to pivot pin 62 substantially the same as the distance from pivot pin 4 to pivot pin 48. This arrangement produces a parallelogram movement whereby the plow or ripper shank 26 is maintained in the same fixed position, whether plowing to the full depth at which the plow or ripper shank is capable, or if the plow or ripper shank is raised above the ground level, as shown in FIG. 1. In this manner the point 27 of the plow or ripper shank is kept at the desired angle to open a furrow for the laying of cable 72 thereinto.

A pair of hydraulic cylinders 30 and 32 is positioned on frame 20, one cylinder on each side thereof, and each cylinder is pivotally connected to the frame by the respective pivot pins 34 and 36, with the plungers 38 and 40, of the respective cylinders 30 and 32, being pivotally connected to frame 24 by the respective pivot pins 42 and 44. The hydraulic system is substantially the same as the hydraulic system as shown in the above mentioned patent.

The mounting bracket 3 extends upwardly and has outwardly extending lugs 46 thereon, which lugs are apertured to receive a pivot pin 48 therethrough, which pivot pin 48 is vertically above pivot pin 4 for complementary pivotal movement, as will be brought out hereinafter. A clevis 50 is pivotally mounted on pivot pin 48 and extends rearward, which clevis is apertured at a right angle, and has a pivot pin 52 therethrough, which pivot pin 52 is in vertically aligned relation with pivot pin 18 for complementary pivotal movement of adjustable brace 54, which brace extends rearwardly and is pivotally connected to a clevis 56 by a pivot pin 58, which pin 58 is in complemental pivotal relation with pivot pin 22 to permit free lateral, swinging movement of the plow or ripper shank. The axis of the vertical pivot pin 22 and vertical pivot pin 52 are substantially in alignment, as is the axis of vertical pivot pin 22 and vertical pivot pin 58. In this manner, as the frame 24, mounting the plow or ripper shank 26, is moved from the position as indicated in full outline in FIG. 3 to the dashed outline position shown therein, a free swinging action is accorded between traction element 1 and frame 24, without strain or stress on any of the parts. The brace 54 will maintain the upper portion of plow or ripper shank 26 braced during any portion of the movement accorded by moving from the position shown in full outline, FIG. 3, to the position shown in dashed outline therein.

The plow or ripper shank 26 has a series of adjustment holes 60 formed therein, with a pivot pin 62 passing through one of the holes in the uppermost portion of the shank 26, which pin is substantially vertically above pivot pin 28, so that the hinge movement of pins 28 and 62 will form substantially a parallelogram, upon movement of brace 54, clevises 50 and 56 and frame members 6, 20 and 24, thereby enabling the raising of plow or ripper shank 26 vertically, while maintaining the shank in an adjusted, fixed relation, such as vertical, with respect to the terrain in which the plow or ripper shank 26 is operating.

Adjustment brace 54 is internally threaded, as indicated at 55 and 55a, with right and left hand threads, which threads threadably engage threaded shafts 55b and 55c. The shaft 55b is apertured to receive pivot pin 58 therethrough to pivotally connect the shaft to clevis 56. The shaft 55c has an eye 55d connected thereto, which eye receives a pin 52 therethrough and through clevis 50, so upon turning brace 54, as by inserting a rod through hole 64 in brace 54, the distance between pivot pins 48 and 62 may be varied to adjust the digging angle of plow point 27 of plow or ripper shank 26. The plow or ripper shank 26 is shown as having a cable guide 66 mounted thereon and extending down the rear side thereof, which cable guide is hingeably mounted on hinge member 68 to enable free swinging movement of rearwardly extending portion 70 of cable guide 66, so that cable 72 may be laid on the bottom of the furrow opened by plow point 27.

The present arrangement permits the laying of cable below the surface of the ground in the manner as set out in the above mentioned patent; however, the shank 26 is maintained in a fixed relation, such as vertical, at all times during the operation, regardless of the depth at which the cable is being laid.

Having thus clearly shown and described the invention, what is claimed as new and desired to be secured by Letters Patent is:

1. An earth engaging plow for forming a furrow below the surface of the ground, into which furrow cable is directed as the plow is moved through the ground, which plow is powered by a prime mover, which plow comprises;
   (a) a mounting bracket adapted to be connected to the rear end of a prime mover,
   (b) a rearwardly extending first frame pivotally connected to said mounting bracket, by a first horizontal pivot pin, for movement of said first frame about a horizontal axis,
   (c) a rearwardly extending first brace member pivotally connected to said mounting bracket, by a second horizontal pivot pin, for movement of said first brace member about a horizontal axis,
      (1) the axis of said rearwardly extending first brace member being a spaced distance above and parallel to the horizontal axis of the pivotal connection between said first frame and said mounting bracket,
   (d) a second rearwardly extending frame pivotally associated with the rear end portion of said first frame and being connected thereto by a first upright pivot pin for movement of said second rearwardly extending frame about an upright axis,
   (e) a second rearwardly extending brace member pivotally associated with the rear end portion of said first brace member and being pivotally connected thereto by a second upright pivot pin for pivotal movement about an upright axis,
      (1) the axis of said first upright pivot pin pivotally connecting said first and second frames and said second upright pivot pin pivotally connecting said first brace member and said second brace member being axially aligned when in one position, and being parallel when in all other positions,
      (2) said first and second upright pivot pins interconnecting said first and second frames and said first and second brace members respectively, are spaced equidistance from said first and said second horizontal pivot pins connecting said first frame and said first brace member, respectively, to said mounting bracket,
   (f) a third frame,
      (1) a third upright pivot pin pivotally interconnecting the forward end portion of said third frame with the rear end portion of said rearwardly extending second frame for relative pivotal movement of said frames about said third upright pivot pin,
   (g) a third brace member,
      (1) a fourth upright pivot pin interconnecting the forward end portion of said third brace member and the rear end portion of said second brace member for relative pivotal movement of said brace members about said second upright pivot pin, (h) said third frame having a horizontal hole formed therethrough near the rear end thereof, with the axis of the horizontal hole being parallel to the axes of said horizontal holes in said mounting bracket, (i) said brace member having a horizontal hole extending therethrough near the rear end thereof with the axis said hole being the same spaced distance from the axis of said fourth upright pivot pin as the axis of said horizontal hole, in said third frame from the axis of said third upright pivot pin, (j) an earth engaging plow shank,
  (1) said earth engaging plow shank having spaced apart holes formed transversely therethrough, the axes of which holes are parallel to the horizontal axes of said mounting bracket, (k) a third horizontal pivot pin adapted to pass through the horizontal hole near the rear end of said third frame and through one of said transverse holes in said plow shank, to pivotally connect said plow shank to the rear of said third frame, (l) a fourth horizontal pivot pin adapted to pass through a horizontal hole in said third brace member and a hole in said plow shank a spaced distance above said third horizontal pin in said third frame, with the upright distances between the axes of said holes in said mounting bracket and the axes of said pins in said holes of said plow shank being substantially equal,
  (1) said rearwardly extending frame members and said rearwardly extending brace members being adapted to swing about said horizontal pivot pins as a parallelogram to raise and lower said plow shank, and (m) said plow frames adapted to swing horizontally about said pairs of upright pivot pins to enable said plow shank to be moved laterally from side to side, and yet maintain the plow shank in a forwardly cutting position.

2. An earth engaging plow for forming a furrow below the surface of the ground, into which furrow a cable is directed as the plow moves through the ground, as defined in claim 1; wherein
  (a) one of said brace members is variable in length relative to said frame members, to vary the angularity of said plow shank with respect to the vertical.

3. An earth engaging plow for forming a furrow below the surface of the ground, into which furrow a cable is directed, as defined in claim 1; wherein
  (a) a fluid actuated power means is associated with said prime mover and with said frame to selectively move said frame about said horizontal axis.

4. An earth engaging, cable laying plow, as defined in claim 1; wherein
  (a) a fluid actuated power means is associated with said prime mover and with said frame to selectively move said frame about said horizontal axis, and
  (b) fluid actuated power means is connected to adjacent frames of said rearwardly extending frames in biased relation on sides of said adjacent frames adjacent one of said upright pivots to selectively move said adjacent frames relative to each other about one of the upright axes of aligned pivot pins.

5. An earth engaging plow for forming a furrow below the surface of the ground, into which furrow a cable is directed, as defined in claim 1; wherein
  (a) conduit means, the lower portion of which forms a transition curve, pivotally connected to the rear of said plow shank for directing a flexible element therethrough and through said curved transition portion into the furrow opened by the plow shank.

6. An earth engaging plow, as defined in claim 5; wherein
  (a) said flexible element is a cable.

7. A cable laying plow for movement through the ground, which plow is attached to a prime mover, and which plow comprises;
  (a) a mounting bracket,
    (1) said mounting bracket having upper and lower horizontal holes formed therein, which holes lie in a vertical plane which is perpendicular to the line of travel,
  (b) pairs of rearwardly extending frame means, one arranged above the other,
    (1) horizontal holes formed in each frame means near each end thereof,
    (2) said horizontal holes in the forward end of said respective frame means adapted to register with the respective horizontal holes in said mounting bracket,
    (3) horizontal pivot means pivotally connecting said respective frame means and said mounting bracket,
  (c) hydraulic power means interconnecting said mounting bracket and one of said frame means pivotally mounted on said bracket to move said frame means relative to said mounting bracket,
  (d) a plow shank,
    (1) said plow shank having transverse, horizontal holes formed therethrough, parallel to the horizontal holes in said mounting bracket,
    (2) pivot pins passing through said horizontal holes in the rear of the respective frame means and through horizontal holes in said plow shank so that the axis of the respective pivot pins in the rear of said frame means and in said plow shank are the same distance apart as the axes of said spaced apart, horizontal holes in said mounting bracket,
    (3) said frame means adapted to pivot about said horizontal axes on said mounting bracket and on said plow shank to raise said plow shank in the same upright position by said frame means, which form a parallelogram,
  (e) a pair of upright pivot pins interconnecting portions of each frame means intermediate the length of the respective frame means,
    (1) the axes of one pair of said upright pivot pins in said upper frame means and in said lower frame means being spaced intermediate the length of said frame means and being equidistant from the respective horizontal axes of holes in said mounting bracket,
    (2) the axes of the other pair of upright pivot pins in said upper frame means and in said lower frame means being spaced intermediate the length of said frame means and being equidistant from the respective horizontal axes of holes in said plow shank,
    (3) each said upright pin in each lower frame means being axially aligned with said respective upright pins in said upper frame means when said frame means are in one position, and which upright pins in one frame means are parallel with said upright pins in said other frame means, when in all other positions, so as to enable unitary, lateral swinging movement of certain portions of said frame means about said upright pivot pins when said frame means are in at least one position with respect to said horizontal pivot pins, and
  (f) hydraulic power means interconnecting two adjacent portions of one of said frame means in abridging relation with respect to one of said upright pivot pins to move said adjacent portions of said frame means relative to each other about said upright axes.

(References on following page)

References Cited

UNITED STATES PATENTS

| | | | |
|---|---|---|---|
| 2,795,178 | 6/1957 | Silver et al. | 172—447 X |
| 3,032,903 | 5/1962 | Ede | 37—193 |
| 3,037,357 | 6/1962 | Knapp et al. | 172—447 X |
| 3,041,751 | 7/1962 | Chattin | 37—98 |
| 3,060,696 | 10/1962 | Lang | 61—72.6 |
| 3,140,745 | 7/1964 | Hinkle et al. | 61—72.4 X |
| 3,170,300 | 2/1965 | Kelley | 61—72.6 |
| 3,175,368 | 3/1965 | Tibbits | 61—72.6 |
| 3,181,619 | 5/1965 | Smith et al. | 172—447 X |

FOREIGN PATENTS

| | | |
|---|---|---|
| 655,004 | 7/1951 | Great Britain. |

EARL J. WITMER, *Primary Examiner.*